United States Patent [19]

Kohoutek et al.

[11] 3,749,899

[45] July 31, 1973

[54] BINARY/BCD ARITHMETIC LOGIC UNIT

[75] Inventors: Jindrich Kohoutek; Charles W. Near, both of Loveland, Colo.

[73] Assignee: Hewlett Packard Company, Palo Alto, Calif.

[22] Filed: June 15, 1972

[21] Appl. No.: 263,015

[52] U.S. Cl. .................................... 235/176
[51] Int. Cl. .................................... G06f 7/50
[58] Field of Search .................... 235/176, 175, 174, 235/170, 169

[56] References Cited

UNITED STATES PATENTS

| | | | |
|---|---|---|---|
| 3,106,637 | 10/1963 | Oliver | 235/175 |
| 3,584,207 | 6/1971 | Avsan | 235/175 |
| 3,596,074 | 7/1971 | Mitrofanoff | 235/176 X |

*Primary Examiner*—Malcolm A. Morrison
*Assistant Examiner*—David H. Malzahn
*Attorney*—Roland I. Griffin

[57] ABSTRACT

Two integrated circuit read-only-memory packages are interconnected with flip-flops and gates to form an arithmetic logic unit for performing arithmetic and logic operations in either a one-bit serial binary mode or a four-bit parallel binary-coded-decimal mode.

1 Claim, 1 Drawing Figure

BINARY / BCD ARITH LOGIC UNIT

PATENTED JUL 31 1973
3,749,899
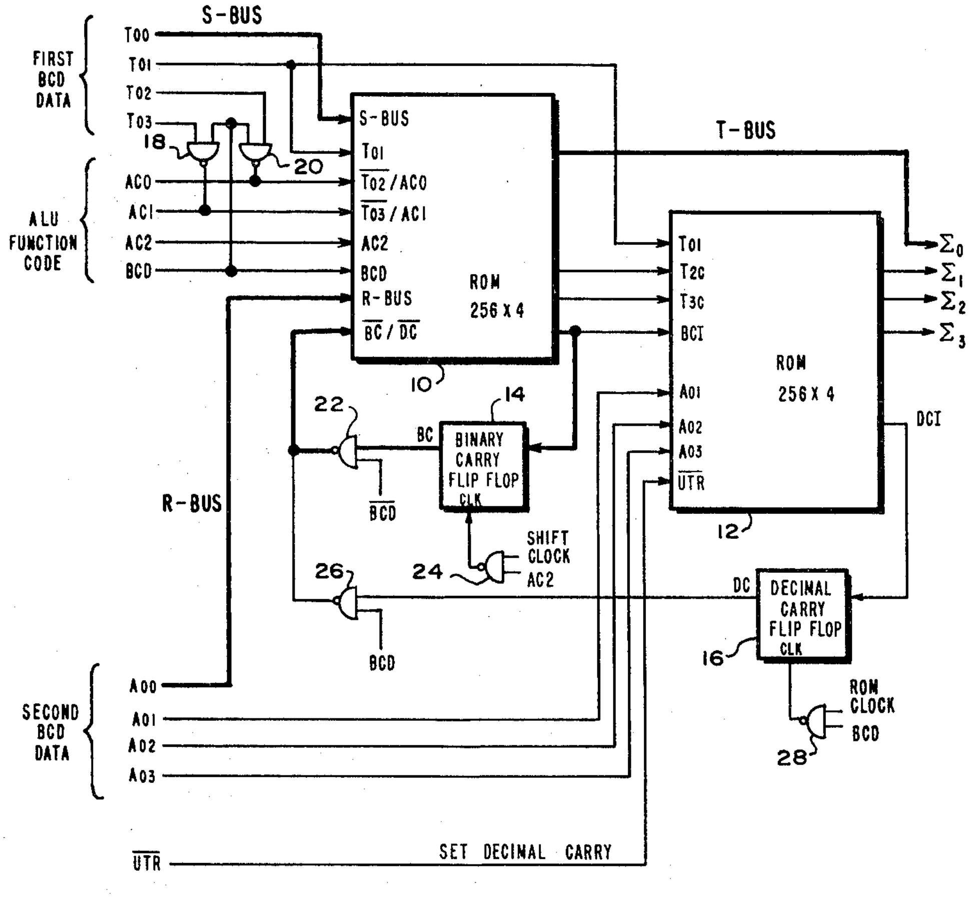
BINARY / BCD ARITH LOGIC UNIT

BINARY/BCD ARITHMETIC LOGIC UNIT

REFERENCE TO RELATED APPLICATION

This application is related to a portion of the subject matter of copending U.S. Patent application Ser. No. 153437 entitled IMPROVED PROGRAMMABLE CALCULATOR, filed on June 15, 1971, by Robert E. Watson, Jack M. Walden, and Charles W. Near and assigned to the same assignee as the present application.

BACKGROUND AND SUMMARY OF THE INVENTION

Digital computers and desk-top calculators have in the past required complicated circuitry in the fabrication of their central processing units and arithmetic logic units. In addition, such units constructed according to the prior art have typically required separate sections of circuitry for performing binary arithmetic/logic operations and binary-coded-decimal (BCD) arithmetic operations. It would be an advantage to provide a central processing unit or arithmetic logic unit fabricated with a minimum number of components and which would utilize the same circuitry for performing both one-bit binary arithmetic/logic and four bit binary-coded-decimal (BCD) arithmetic.

This advantage is realized in accordance with the preferred embodiment of this invention by employing two bipolar read-only-memory chips in combination with carry flip-flops and gates. BCD functions and binary functions are selected at the input of one of the read-only-memory chips. Common buses are used for inputting and outputting data in both modes of operation.

DESCRIPTION OF THE DRAWING

The drawing is a block diagram of a binary/BCD arithmetic logic unit according to the preferred embodiment of this invention.

DESCRIPTION OF THE PREFERRED EMBODIMENT

Referring to the drawing, there is shown a block diagram of an arithmetic logic unit employed in the desk-top calculator shown and described in the application cited above. Two bipolar read-only-memory chips 10 and 12 may comprise, for example, Hewlett-Packard 16-pin dual-in-line packaged bipolar read-only-memories (ROMs) organized into 256 words by four bits and of the same type as shown and described in U.S. Patent Application Ser. No. 12262, filed on Feb. 18, 1970, now U.S. Pat. No. 3721964, by John C. Barrett et al and assigned to the same assignee as this patent application. In addition to these ROMs a binary carry flip-flop 14 and a decimal carry flip-flop 16 may be implemented using one dual D-type flip-flop package. A group of NAND gates 18, 20, 22, 24, 26, 28 may comprise, for example, two quad two-input NAND-gate packages commonly available as off-the-shelf components.

It may be seen that the logical function code inputs BCD and $\overline{BCD}$ select between the binary and BCD modes of operation. Within these modes the desired binary logical functions, binary arithmetic operations or BCD operations may be selected by the ALU code as shown in the following table.

| | ALU code | | | | | |
|---|---|---|---|---|---|---|
| | BCD | AC2 | AC1 | AC0 | ALU function | Description |
| Binary functions | 0 | 0 | 0 | 0 | XOR | Exclusive OR . . . . R ⊕ S ⟶ T. |
| | 0 | 0 | 0 | 1 | AND | Logical AND . . . . R · S ⟶ T. |
| | 0 | 0 | 1 | 0 | IOR | Inclusive OR . . . . R + S ⟶ T. |
| | 0 | 0 | 1 | 1 | ZTT | Zero ⟶ T-BUS. |
| | 0 | 1 | 0 | 0 | ZTT·CBC | Zero → T-BUS, Clear Binary Carry. |
| | 0 | 1 | 0 | 1 | IOR·CBC | Inclusive OR, Clear Binary Carry. |
| | 0 | 1 | 1 | 0 | IOR·SBC | Inclusive OR, Set Binary Carry. |
| | 0 | 1 | 1 | 1 | ADD | Binary ADD . . . . R + S BC → T,C. |
| BCD functions | 1 | 0 | 1 | 1 | BCD ADD | BCD ADD . . . . $T_{0-3} + A_{0-3} \rightarrow \Sigma_{0-3}$. |
| | 1 | 1 | 1 | 1 | BCD COMP/ADD | IO's Complement and BCD ADD. |

ALU FUNCTION CODE ASSIGNMENTS

In the binary mode, the function code inputs AC0, AC1, and AC2 select the desired logical function or arithmetic operation. The binary input data enters ROM 10 on the carry, S-bus and R-bus input lines, and the binary result appears on the T-bus and binary carry output lines. ROM 12 is not used in the binary mode.

In the BCD mode of operation, the two function code lines AC0 and AC1 carry the T02 and T03 bits of BCD data. The ALU function code line AC2 is used to select the desired BCD operation. If AC2 is low, the four-bit output Σ0, Σ1, Σ2, Σ3 will be the BCD sum of the two BCD data inputs. If AC2 is high and decimal carry flip-flop 16 has been set, the four-bit output Σ0, Σ1, Σ2, Σ3will be the BCD tens complement of the first BCD input data. In the BCD mode, the binary carry flip-flop 14 will be disabled and the decimal carry flip-flop 16 output will be enabled to ROM 10.

Although only one-fourth of the available registers in ROM 10 are required for the eight binary operations, the concept of adding a second 1024-bit ROM to perform the BCD operations is the result of several considerations:

1. The least significant BCD sum bit, Σ0, is always identical to the binary sum bit; therefore, only three additional outputs, Σ1, Σ2, and Σ3 need be generated. For BCD complement operations, the decimal carry flip-flop defines whether or not the least significant bit should be complemented.
2. In forming the nine's complement in ROM 10 of the first BCD data, it can be seen that for 8421 code the second least significant bit T01 is the same before and after forming the complement. Thus only two bits, T02 and T03 need be complemented prior to input into ROM 12. The ten's complement with add is then found by presetting decimal carry flip-flop 16 and performing a BCD sum of the three most significant digits in ROM 12.
3. With only eight ROM inputs available, some sharing of inputs is required for ROM 10. During binary operations, all four function codes and only one bit of data is required. During BCD operations, all four bits of data and only two function codes are required. Use of two NAND gates 18 and 20 in wire-OR connection with the open collector function codes AC0 and AC1 permits sharing of the two inputs.

This arrangement left one input still available to ROM 12. By arranging this input to always make output DCI true, a micro-instruction $\overline{UTR}$ can serve two purposes — placing units on the R-bus and also setting decimal carry flip-flop 16 if BCD is true. When BCD is false, a clock signal is inhibited to the decimal carry flip-flop. This feature permits saving decimal carry information during all binary operations. Similarly, binary carry is saved during the four binary operations AND, IOR, XOR, and ZTT by connecting AC2 such that when AC2 is false the shift clock is inhibited to the binary carry flip-flop.

In summary, the mode select input BCD performs the following functions:

1. Addresses the proper 128 word set of word lines in ROM 10.
2. Enables the T02 and T03 data lines to ROM 10 only in BCD mode.
3. Enables clock to decimal carry flip-flop only in BCD mode.
4. Selects binary carry or decimal carry into ROM 10 as appropriate.
5. Provides outputs Σ0, Σ1, Σ2, Σ3, only in BCD mode.

The remaining three ALU function codes select the proper set of word lines in ROM 10 to perform the eight binary functions. In addition, the AC2 input performs the following functions.

1. Enables clock to binary carry flip-flop 14 only during the four carry-related binary functions and the BCD comp/add function.
2. In the BCD mode, AC2 selects conversion of BCD data bits T00, T02, and T03 to nine's complement form.

The arithmetic logic unit has a total of 15 inputs which include eight data inputs, two clock inputs and five microinstructions. Four data output lines are provided and two additional output lines from carry flip-flops 14 and 16 are available, for example, as inputs to a microprocessor unit.

The following table gives an example of how the two ALU ROM chips 10 and 12 shown in FIG. 1 can be constructed to implement the above described ALU functions (in this table each "1" represents a "low" state and each "0" represents a "high" state):

ROM 10

| | | | |
|---|---|---|---|
| / 1000; | 1/ 0000; | 2/ 0000; | 3/ 1000 |
| 4/ 1000; | 5/ 0000; | 6/ 0000; | 7/ 1000 |
| 8/ 0000; | 9/ 0000; | 10/ 0000; | 11/ 1000 |
| 12/ 0000; | 13/ 0000; | 14/ 0000; | 15/ 1000 |
| 16/ 0000; | 17/ 1000; | 18/ 1000; | 19/ 1000 |
| 20/ 0000; | 21/ 1000; | 22/ 1000; | 23/ 1000 |
| 24/ 1000; | 25/ 1000; | 26/ 1000; | 27/ 1000 |
| 28/ 1000; | 29/ 1000; | 30/ 1000; | 31/ 1000 |
| 32/ 1000; | 33/ 0000; | 34/ 0000; | 35/ 1000 |
| 36/ 1000; | 37/ 0000; | 38/ 0000; | 39/ 1000 |
| 40/ 0000; | 41/ 0000; | 42/ 0000; | 43/ 1000 |
| 44/ 0000; | 45/ 0000; | 46/ 0000; | 47/ 1000 |
| 48/ 0000; | 49/ 1000; | 50/ 1000; | 51/ 1000 |
| 52/ 0000; | 53/ 1000; | 54/ 1000; | 55/ 1000 |
| 56/ 1000; | 57/ 1000; | 58/ 1000; | 59/ 1000 |
| 60/ 1000; | 61/ 1000; | 62/ 1000; | 63/ 1000 |
| 64/ 1100; | 65/ 1100; | 66/ 1100; | 67/ 1100 |
| 68/ 1100; | 69/ 1100; | 70/ 1100; | 71/ 1100 |
| 72/ 0000; | 73/ 0000; | 74/ 0000; | 75/ 1000 |
| 76/ 0000; | 77/ 0000; | 78/ 0000; | 79/ 1000 |
| 80/ 0100; | 81/ 0100; | 82/ 0100; | 83/ 1100 |
| 84/ 0100; | 85/ 0100; | 86/ 0100; | 87/ 1100 |
| 88/ 0000; | 89/ 1000; | 90/ 1000; | 91/ 0100 |
| 92/ 1000; | 93/ 0100; | 94/ 0100; | 95/ 1100 |
| 96/ 1100; | 97/ 1100; | 98/ 1100; | 99/ 1100 |
| 100/ 1100; | 101/ 1100; | 102/ 1100; | 103/ 1100 |
| 104/ 0000; | 105/ 0000; | 106/ 0000; | 107/ 1000 |
| 108/ 0000; | 109/ 0000; | 110/ 0000; | 111/ 1000 |
| 112/ 0100; | 113/ 0100; | 114/ 0100; | 115/ 1100 |
| 116/ 0100; | 117/ 0100; | 118/ 0100; | 119/ 1100 |
| 120/ 0000; | 121/ 1000; | 122/ 1000; | 123/ 0100 |
| 124/ 1000; | 125/ 0100; | 126/ 0100; | 127/ 1100 |
| 128/ 0000; | 129/ 0000; | 130/ 0000; | 131/ 0000 |
| 132/ 0000; | 133/ 0000; | 134/ 0000; | 135/ 0000 |
| 136/ 0010; | 137/ 1010; | 138/ 1010; | 139/ 0110 |
| 140/ 1010; | 141/ 0110; | 142/ 0110; | 143/ 1110 |

| | | | | | | | |
|---|---|---|---|---|---|---|---|
| 144/ | 0001; | 145/ | 1001; | 146/ | 1001; | 147/ | 0101 |
| 148/ | 1001; | 149/ | 0101; | 150/ | 0101; | 151/ | 1101 |
| 152/ | 0011; | 153/ | 1011; | 154/ | 1011; | 155/ | 0111 |
| 156/ | 1011; | 157/ | 0111; | 158/ | 0111; | 159/ | 1111 |
| 160/ | 0000; | 161/ | 0000; | 162/ | 0000; | 163/ | 0000 |
| 164/ | 0000; | 165/ | 0000; | 166/ | 0000; | 167/ | 0000 |
| 168/ | 0010; | 169/ | 1010; | 170/ | 1010; | 171/ | 0110 |
| 172/ | 1010; | 173/ | 0110; | 174/ | 0110; | 175/ | 1110 |
| 176/ | 0000; | 177/ | 0000; | 178/ | 0000; | 179/ | 0000 |
| 180/ | 0000; | 181/ | 0000; | 182/ | 0000; | 183/ | 0000 |
| 184/ | 0011; | 185/ | 1011; | 186/ | 1011; | 187/ | 0111 |
| 188/ | 1011; | 189/ | 0111; | 190/ | 0111; | 191/ | 1111 |
| 192/ | 0000; | 193/ | 0000; | 194/ | 0000; | 195/ | 0000 |
| 196/ | 0000; | 197/ | 0000; | 198/ | 0000; | 199/ | 0000 |
| 200/ | 1010; | 201/ | 0010; | 202/ | 0110; | 203/ | 1010 |
| 204/ | 0110; | 205/ | 1010; | 206/ | 1110; | 207/ | 0110 |
| 208/ | 1011; | 209/ | 0010; | 210/ | 0111; | 211/ | 1011 |
| 212/ | 0111; | 213/ | 1011; | 214/ | 1111; | 215/ | 0111 |
| 216/ | 1001; | 217/ | 0001; | 218/ | 0101; | 219/ | 1001 |
| 220/ | 0101; | 221/ | 1001; | 222/ | 1101; | 223/ | 0101 |
| 224/ | 0000; | 225/ | 0000; | 226/ | 0000; | 227/ | 0000 |
| 228/ | 0000; | 229/ | 0000; | 230/ | 0000; | 231/ | 0000 |
| 232/ | 1011; | 233/ | 0011; | 234/ | 0111; | 235/ | 1011 |
| 236/ | 0111; | 237/ | 1011; | 238/ | 1111; | 239/ | 0111 |
| 240/ | 0000; | 241/ | 0000; | 242/ | 0000; | 243/ | 0000 |
| 244/ | 0000; | 245/ | 0000; | 246/ | 0000; | 247/ | 0000 |
| 248/ | 1010; | 249/ | 0010 | 250/ | 0110; | 251/ | 1010 |
| 252/ | 0110; | 253/ | 1010; | 254/ | 1110; | 255/ | 0110 |

ROM 12

| | | | | | | | |
|---|---|---|---|---|---|---|---|
| / | 0000; | 1/ | 0000; | 2/ | 0000; | 3/ | 0000 |
| 4/ | 0000; | 5/ | 0000; | 6/ | 0000; | 7/ | 0000 |
| 8/ | 0000; | 9/ | 0000; | 10/ | 0000; | 11/ | 0000 |
| 12/ | 0000; | 13/ | 0000; | 14/ | 0000; | 15/ | 0000 |
| 16/ | 0000; | 17/ | 0000; | 18/ | 0000; | 19/ | 0000 |
| 20/ | 0000; | 21/ | 0000; | 22/ | 0000; | 23/ | 0000 |
| 24/ | 0000; | 25/ | 0000; | 26/ | 0000; | 27/ | 0000 |
| 28/ | 0000; | 29/ | 0000; | 30/ | 0000; | 31/ | 0000 |
| 32/ | 0000; | 33/ | 0000; | 34/ | 0000; | 35/ | 0000 |
| 36/ | 0000; | 37/ | 0000; | 38/ | 0000; | 39/ | 0000 |
| 40/ | 0000; | 41/ | 0000; | 42/ | 0000; | 43/ | 0000 |
| 44/ | 0000; | 45/ | 0000; | 46/ | 0000; | 47/ | 0000 |
| 48/ | 0000; | 49/ | 0000; | 50/ | 0000; | 51/ | 0000 |
| 52/ | 0000; | 53/ | 0000; | 54/ | 0000; | 55/ | 0000 |
| 56/ | 0000; | 57/ | 0000; | 58/ | 0000; | 59/ | 0000 |
| 60/ | 0000; | 61/ | 0000; | 62/ | 0000; | 63/ | 0000 |
| 64/ | 0000; | 65/ | 0000; | 66/ | 0000; | 67/ | 0000 |
| 68/ | 0000; | 69/ | 0000; | 70/ | 0000; | 71/ | 0000 |
| 72/ | 0000; | 73/ | 0000; | 74/ | 0000; | 75/ | 0000 |
| 76/ | 0000; | 77/ | 0000; | 78/ | 0000; | 79/ | 0000 |
| 80/ | 0000; | 81/ | 0000; | 82/ | 0000; | 83/ | 0000 |
| 84/ | 0000; | 85/ | 0000; | 86/ | 0000; | 87/ | 0000 |
| 88/ | 0000; | 89/ | 0000; | 90/ | 0000; | 91/ | 0000 |
| 92/ | 0000; | 93/ | 0000; | 94/ | 0000; | 95/ | 0000 |
| 96/ | 0000; | 97/ | 0000; | 98/ | 0000; | 99/ | 0000 |
| 100/ | 0000; | 101/ | 0000; | 102/ | 0000; | 103/ | 0000 |
| 104/ | 0000; | 105/ | 0000; | 106/ | 0000; | 107/ | 0000 |
| 108/ | 0000; | 109/ | 0000; | 110/ | 0000; | 111/ | 0000 |
| 112/ | 0000; | 113/ | 0000; | 114/ | 0000; | 115/ | 0000 |

| | | | | | | | |
|---|---|---|---|---|---|---|---|
| 116/ | 0000; | 117/ | 0000; | 118/ | 0000; | 119/ | 0000 |
| 120/ | 0000; | 121/ | 0000; | 122/ | 0000; | 123/ | 0000 |
| 124/ | 0000; | 125/ | 0000; | 126/ | 0000; | 127/ | 0000 |
| 128/ | 1111; | 129/ | 1101; | 130/ | 1011; | 131/ | 1001 |
| 132/ | 0111; | 133/ | 0000; | 134/ | 0000; | 135/ | 0000 |
| 136/ | 1101; | 137/ | 1011; | 138/ | 1001; | 139/ | 0111 |
| 140/ | 1110; | 141/ | 0000; | 142/ | 0000; | 143/ | 0000 |
| 144/ | 1011; | 145/ | 1001; | 146/ | 0111; | 147/ | 1110 |
| 148/ | 1100; | 149/ | 0000; | 150/ | 0000; | 151/ | 0000 |
| 152/ | 1001; | 153/ | 0111; | 154/ | 1110; | 155/ | 1100 |
| 156/ | 1010; | 157/ | 0000; | 158/ | 0000; | 159/ | 0000 |
| 160/ | 0111; | 161/ | 1110; | 162/ | 1100; | 163/ | 1010 |
| 164/ | 1000; | 165/ | 0000; | 166/ | 0000; | 167/ | 0000 |
| 168/ | 0000; | 169/ | 0000; | 170/ | 0000; | 171/ | 0000 |
| 172/ | 0000; | 173/ | 0000; | 174/ | 0000; | 175/ | 0000 |
| 176/ | 0000; | 177/ | 0000; | 178/ | 0000; | 179/ | 0000 |
| 180/ | 0000; | 181/ | 0000; | 182/ | 0000; | 183/ | 0000 |
| 184/ | 0000; | 185/ | 0000; | 186/ | 0000; | 187/ | 0000 |
| 188/ | 0000; | 189/ | 0000; | 190/ | 0000; | 191/ | 0000 |
| 192/ | 1101; | 193/ | 1011; | 194/ | 1001; | 195/ | 0111 |
| 196/ | 1110; | 197/ | 0000; | 198/ | 0000; | 199/ | 0000 |
| 200/ | 1011; | 201/ | 1001; | 202/ | 0111; | 203/ | 1110 |
| 204/ | 1100; | 205/ | 0000; | 206/ | 0000; | 207/ | 0000 |
| 208/ | 1001; | 209/ | 0111; | 210/ | 1110; | 211/ | 1100 |
| 212/ | 1010; | 213/ | 0000; | 214/ | 0000; | 215/ | 0000 |
| 216/ | 0111; | 217/ | 1110; | 218/ | 1100; | 219/ | 1010 |
| 220/ | 1000; | 221/ | 0000; | 222/ | 0000; | 223/ | 0000 |
| 224/ | 1110; | 225/ | 1100; | 226/ | 1010; | 227/ | 1000 |
| 228/ | 0110; | 229/ | 0000; | 230/ | 0000; | 231/ | 0000 |
| 232/ | 0000; | 233/ | 0000; | 234/ | 0000; | 235/ | 0000 |
| 236/ | 0000; | 237/ | 0000; | 238/ | 0000; | 239/ | 0000 |
| 240/ | 0000; | 241/ | 0000; | 242/ | 0000; | 243/ | 0000 |
| 244/ | 0000; | 245/ | 0000; | 246/ | 0000; | 247/ | 0000 |
| 248/ | 0000; | 249/ | 0000; | 250/ | 0000; | 251/ | 0000 |
| 252/ | 0000; | 253/ | 0000; | 254/ | 0000; | 255/ | 0000 |

We claim

1. An arithmetic logic unit for selectively performing binary arithmetic/logic and binary-coded-decimal (BCD) arithmetic, said arithmetic logic unit comprising:

a first read-only-memory with at least eight inputs for receiving binary data, binary carry information, first BCD data information, second BCD data information, and coded function information, said first read-only-memory also having at least four outputs for issuing binary result information, binary carry information, and auxiliary information;

a second read-only-memory with inputs for receiving first BCD data information, auxiliary information from the first read-only-memory, binary carry information from the first read-only-memory, and second BCD data information, said second read-only-memory also having outputs for issuing BCD result information and decimal carry information;

a first binary storage element connected between an output and an input of the first read-only-memory for storing binary carry information;

a second binary storage element connected between an output of the second read-only-memory and an input of the first read-only-memory for storing decimal carry information;

first logic means connected to the first and second binary storage elements and to the first read-only-memory for selectively applying binary and decimal carry information to the first read-only-memory; and second logic means for selectively enabling the first and second binary storage elements to change state.

* * * * *